June 18, 1974 TAKAYUKI MIZUTANI ET AL 3,817,710
APPARATUS FOR PRODUCING CRYSTAL
Filed Sept. 13, 1971 2 Sheets-Sheet 1

INVENTORS
TAKAYUKI MIZUTANI
KOUICHI MATSUMI by
Sandoe, Hopgood & Calimafde
ATTORNEYS United States Patent Office 3,817,710
Patented June 18, 1974

3,817,710
APPARATUS FOR PRODUCING CRYSTAL
Takayuki Mizutani and Kouichi Matsumi, Tokyo, Japan, assignors to Nippon Electric Company, Limited, Tokyo, Japan
Filed Sept. 13, 1971, Ser. No. 179,714
Claims priority, application Japan, Sept. 18, 1970, 45/82,438
Int. Cl. B01j 17/10
U.S. Cl. 23—273 SP 7 Claims

ABSTRACT OF THE DISCLOSURE

Crystal growing apparatus includes a prolate spherical reflecting mirror having a halogen lamp at one focus thereof, and the molten junction between seed and source crystalline materials at the other mirror focus. Lamp life is extended by separating the lamp and crystalline material, and flowing a gas about the lamp. Also, the temperature of the molten crystal material is maintained essentially homogenous in the circumferential direction by employing a minor-major mirror diameter ratio in the range 0.87 to 0.96.

DETAILED DESCRIPTION OF THE INVENTION

This invention relates to crystal growing and, more specifically, to apparatus for growing a crystal by concentrating radiation, the apparatus employing a reflective mirror for this purpose.

FIG. 1 shows an example of prior art apparatus for growing a crystal, employing a reflective mirror to concentrate radiation. Such apparatus is described in IEEE Transactions on Magnetics, vol. MAG-5, No. 3, pp. 285–289 (September 1969). In FIG. 1, there is shown a light source 1 for emitting light radiation, in this case a halogen lamp, the source 1 including a filament 2. A prolate spheroid mirror 3 concentrates light by reflecting the light emitted from the halogen lamp, the filament 2 of the halogen lamp 1 being positioned on a focus $F_1$ of the mirror surface 3. A seed crystal 4 in the form of rod, and raw material 5 in the form of rod are arranged such that the individual axis thereof coincide with the vertical axis passing through the other focus $F_2$ of the spheroid mirror 3; and the junction of the seed 4 and the raw material 5 are positioned on the focus $F_2$.

Light emitted from the filament 2 of the halogen lamp 1 is reflected by the reflective mirror 3 and concentrated at the focus $F_2$ of the mirror 3 as indicated by arrows 6, 7, 8 and 9. The junction of the seed 4 and raw material 5 is thus heated to a high temperature, and melted to form a molten zone 10.

The seed 4 is held by a chuck 11, which in turn is held by a lower holding shaft 12. The raw material 5 is attached to a chuck 13, which in turn is attached to an upper holding shaft 14.

By moving the lower holding shaft 12 and the upper holding shaft 14 downwards simultaneously, and slowly, while keeping the distance therebetween constant, a new crystal grows on the seed 4. Since the mechanism of crystal growth described above employs the well known floating zone technique and principles, and since the mechanism for simultaneous moving the lower holding shaft 12 and the upper holding shaft 14 is also well known, their details will not be described herein.

One of the features of the apparatus of FIG. 1 resides in the employment of the halogen lamp 1 as light source. The halogen lamp is characterized by the following properties: (1) during its service life, the quantity of its light output does not vary; (2) by maintaining the lamp energizing voltage at a constant value, a highly stable output can be maintained; (3) the lamp can be energized by commercial alternating current, thereby permitting adjustment of its light output with very simple apparatus (for example, a slide transformer).

Therefore, by the employment of the halogen lamp 1 as light source in the apparatus of FIG. 1, the following features can be provided:

(a) Since a stable light output can be obtained over a very long period of time, it is possible to stably grow the crystal even at a very slow crystal growth rate.

(b) The temperature of the molten zone can be easily adjusted.

Since these features are necessary conditions for crystal growth, it is apparent that such apparatus, employing a halogen lamp as light source, is highly suitable for crystal growth.

Moreover, another feature of the FIG. 1 appparatus resides in the fact that the reflecting mirror 3 constitutes a reflecting surface comprising almost the entire surface of the prolate spheroid cavity, i.e., the whole such surface excluding those portions which are required for holes to insert the seed crystal 4 and raw material 5, and also the socket of the halogen lamp 1.

This feature provides the following two advantages.

(1) The light from the halogen lamp 1 can be concentrated upon the crystal with a high degree of effectiveness.

(2) Since the light may be uniformly concentrated at the crystal from all directions, the circumferential temperature distribution of the crystal may be uniform.

Since these two features are also necessary for crystal growth, it is apparent that such apparatus using the reflecting mirror comprising almost the entire surface of the spheroid is highly suitable for crystal growth.

As described above, the crystal producing apparatus of FIG. 1 has excellent attributes. However, it has been found that the apparatus of FIG. 1 has some deficiencies which must be solved in order that it be put into practical service. These problems are as follows:

(1) When the halogen lamp is activated in the FIG. 1 arrangement, the life of the lamp is reduced to only several hours.

(2) When the configuration of the reflecting mirror is not appropriate, the circumferential temperature distribution of the crystal does not become uniform, thereby giving rise to many defects in the crystal.

It is, therefore, an object of the present invention to render crystal producing apparatus of the type shown in FIG. 1 practical by solving the above stated problems.

The above and other objects of the present invention are realized in specific illustrative crystal producing apparatus, described hereinbelow in conjunction with the accompanying drawing, in which:

FIG. 1 exemplifies prior art apparatus for producing crystal by means of a radiant energy as above discussed;

First, a solution for the problem (1) described above will be described.

Figure 1:
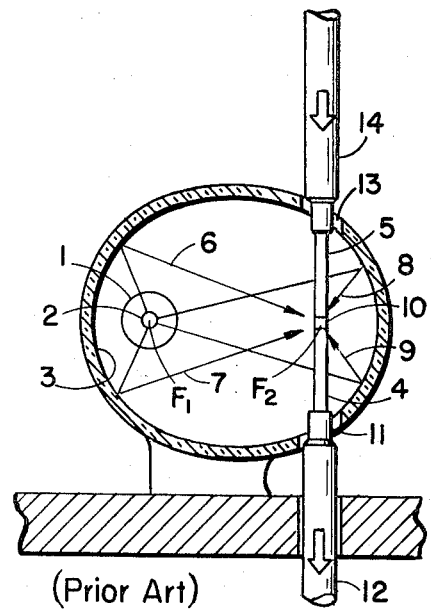

In FIG. 1, the light emitted from the filament 2 of the halogen lamp 1 is concentrated at the other reflector focus $F_2$, and almost completely absorbed by the molten zone 10 of the crystal. The crystal zone 10 is thereby heated to a temperature of over 1,500° C. At such a high temperature, the heat is principally dissipated by radiation, and thus the greater part of the light absorbed by the molten zone 10 is again radiated from the molten zone 10. This light radiated from the molten zone 10 is reflected by the reflecting mirror 3 as before, and concentrated at the vicinity of the focus $F_1$, thereby heating the lamp 1 and filament 2. In particular, it has been determined that the outer transparent quartz tube of the lamp 1 is heated to a remarkable extent. According to measurements, it has been found that when a 1 kw. lamp is illuminated in the FIG. 1 arrangement, the outer tube of the lamp 1 is overheated to a temperature as high as 1,200° C. While it is necessary to maintain the temperature of the outer tube of the halogen lamp within a range of 200–1,000° C. in order to insure the adequate operation of the halogen cycle, the temperature measured apparently exceeds this temperature range. Therefore, in several tens of minutes after lighting, the tube wall starts to assume a back color thereby leading to a further rise of the tube wall temperature. Also, the outer tube starts to expand due to the internal pressure of the tube, thereby giving rise to filament damage in several hours.

Therefore, it has been found that the structure of FIG. 1 is not practicable. Thus, the apparatus of FIG. 2 is provided to solve the foregoing problem.

Figure 2:
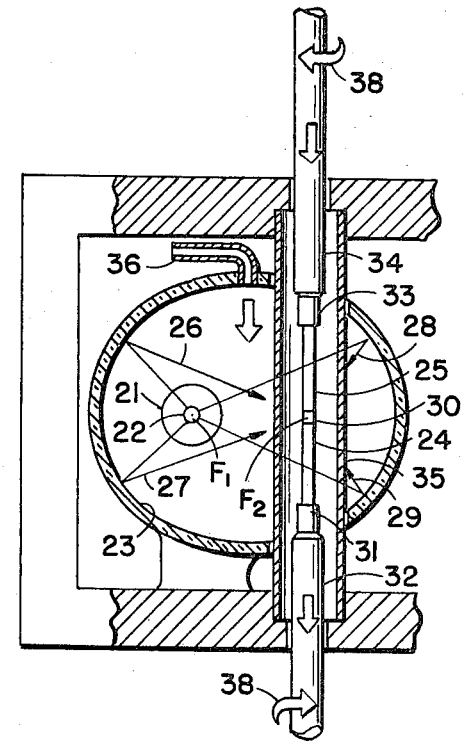
FIG. 2 depicts an embodiment of the present invention.

FIG. 2 is an embodiment of the present invention, and depicts crystal growing apparatus including a halogen lamp 21 including a filament 22, and a prolate spheroid mirror 23 for reflecting and concentrating the light from the halogen lamp 21. The filament 22 of the halogen lamp 21 is positioned at a mirror focus $F_1$. A seed crystal 24 in the form of a rod and raw material 25 in rod form are arranged such that the individual axis thereof coincides with the vertical axis passing through the other focus $F_2$ of the spheroid mirror 23, and such that the junction of the seed 24 and the raw material 25 is positioned at the reflector focus $F_2$.

As in the case for the FIG. 1 arrangement, the junction of the seed 24 and the raw material 25 is heated and melted by light following the light propagating paths 26, 27, 28, 29 and so forth from the lamp to form a molten zone 30.

As is also the case with respect to FIG. 1, the seed 24 is attached through a chuck 31 to a lower holding shaft 32 and the raw material 25 is attached through a chuck 33 to an upper holding shaft 34. By moving both the lower holding shaft 32 and the upper holding shaft 34 downward while keeping the distance therebetween constant, a crystal grows on the seed 24.

A transparent quartz tube 35 is provided to separate the atmosphere in the vicinity of seed 24, the raw material 25 and the molten zone 30 from the atmosphere within the reflecting mirror 23. Further, an inlet 36 introduces air into the cavity of the reflecting mirror 23. It has been found that by blowing air through the inlet 36 into the interior of the reflecting mirror 23, the life of the halogen lamp 21 can be extended to a remarkable extent. However, when the cooling air is directly blown against the lamp 21, the temperature of the outer tube becomes too low, due to the localized strong cooling of the outer tube of the lamp 21 to ensure proper operation of the halogen cycle. Further, part of the outer tube assumes a black color, thereby causing the lamp light output to decrease. Sometimes also, a great reduction of life for the lamp 21 occurs. In order to prevent this, the cooling air must be introduced into the reflecting mirror to replace the air within the reflecting mirror 23 with fresh air, and not impinge against the lamp 21. According to experiments, it has been found that by completely replacing the air within the reflecting mirror 23 by new air at a rate of one or more times every 2 seconds, irrespective of the internal volume of the reflecting mirror 23, lamp life can be extended to a large extent. The fresh air may be cooled or at room temperature. Other gases such as nitrogen or argon may be used instead of air with a similar result.

Figure 3:
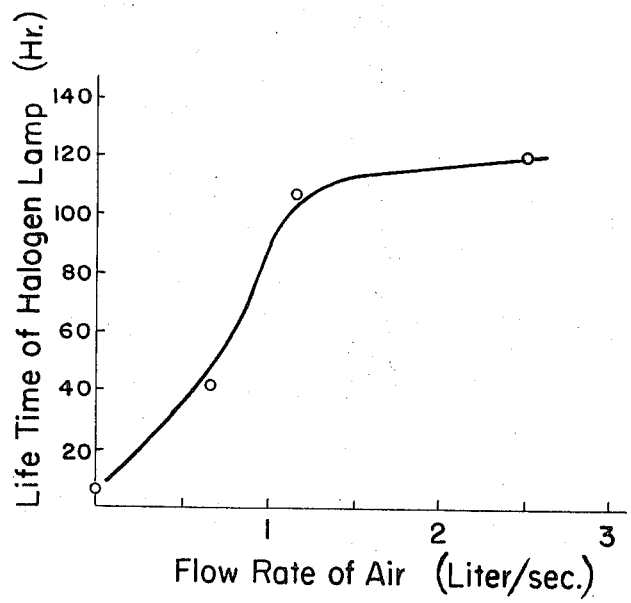
FIG. 3 is a graph showing the relationship between the flow rate of cooling air and lamp life.

FIG. 3 is a graph showing the relationship between the amount of air introduced into the reflecting mirror 23 (volume: 2.3 liters) through the inlet 36 per unit time and the life time of a halogen lamp 21 of 100 v., 1 kw. As is clear from FIG. 3, the introduction of air at a rate exceeding about 1.17 liter/sec. extends the life of the halogen lamp 21 to more than 100 hours.

Also, it has been found that, upon introducing air at a rate of 2.5 liter/sec., the temperature of the outer tube of the halogen lamp 21 is 300° C., which is within the temperature range for appropriate operation of the halogen cycle.

In the apparatus of FIG. 1, when a halogen lamp 1 of 100 v., 1 kw. was illuminated, the temperature of the reflecting mirror 3 rises to about 200° C. and hence it is necessary to cool the mirror, for example, by water. In the apparatus of FIG. 2, however, when air is introduced at a rate of 2.5 liter/sec. from the inlet 36, the temperature rise of the reflecting mirror 23 is only about 70° C., thereby eliminating the necessity for mirror cooling.

Also, when air is not introduced into the reflecting mirror 23, the temperature in the vicinity of the molten zone 30 of the quartz tube 35 is about 800° C., thereby causing the possibility that impurities discharged from the inside of the quartz tube 35 may enter the crystal. However, when air is introduced into the reflecting mirror at the rate of 2.5 liter/sec. through the inlet 36, the temperature in the vicinity of the molten zone 30 of the quartz tube 35 is only 200° C. Therefore, the possibility that impurities enter from the quartz tube into the crystal can essentially be disregarded.

In summary then, the important advantages derived from introducing air into the reflecting mirror are as follows:

(1) The life of the halogen lamp can be extended to more than 100 hours.

(2) Cooling is not required for the reflecting mirror.

(3) The temperature of the quartz tube which isolates the atmosphere surrounding the crystal is sufficiently lowered to inhibit impurities from the quartz tube from entering the crystal.

The reflecting mirror need not be sealed, and openings or gaps are left by holes for installing the quartz tube 35 and halogen lamp 21. Therefore, the cooling air introduced into the reflecting mirror is exhausted from these openings. For this reason, an air outlet port is not specifically required. Although air has been described in the foregoing as being blown into the reflecting mirror 23 through the inlet 36, it has been experimentally confirmed that air can be drained out from, instead of being blown into, the reflecting mirror 23 through the inlet 36 with equivalent results, subject to like air flow rates.

In order to blow air into the optical system, the inlet 36 may be connected to a blower or to an air compressor which is commonly found in industrial facilities and, in the case of air drawing, the inlet 36 may be connected to an exhaust pump or the like. These mechanisms are well known and therefore are not shown in FIG. 2.

The quartz tube 35 may be replaced by any other tube material which is transparent and heat-resistant.

The problem (2) described above in relation to the apparatus of FIG. 1 will now be considered. When the spatial configuration of the optical system is not as prescribed, the temperature distribution in the circumferential direction of a crystal becomes non-uniform and the resultant crystal has many defects, such as internal strain. The quantity of light irradiated upon the front side (facing the lamp) of the molten zone 10 will now be compared to the quantity of light reaching the opposite side thereof for the FIG. 1 arrangement.

Figure 4:
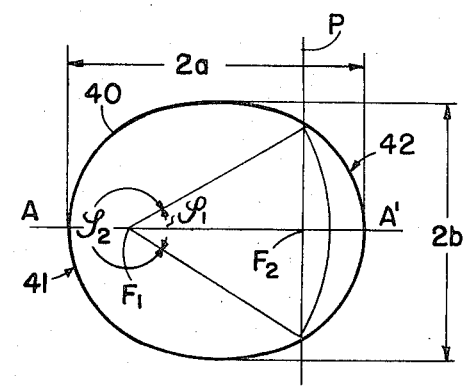
FIG. 4 illustrates the dimensional relationships for a reflecting mirror used in the apparatus of FIG. 1.

FIG. 4 shows the dimensional relationships of the reflecting mirror of FIG. 1, wherein a prolate spheroid 40 constitutes the reflecting mirror, and a major diameter 2a and a minor diameter 2b, respectively. Now, it is assumed that a plane P passes through the focus $F_2$ and is perpendicular to the major axis A-A' of the spheroid. The prolate spheroid 40 is thus divided by the plane P into two parts, i.e., a left side part 41 and a right side part 42.

It is considered herein that such part of the light emitted from the focus $F_1$ that is reflected by the major part 41 of the spheroid 40 irradiates the front side (facing the lamp) of the molten zone 10, and the other light portion which is reflected by the mirror part 42 of the spheroid irradiates the opposite side of the zone 10. The quantity of light reflected by the minor part 42 of the spheroid is considered to be proportional to the solid angle $\varphi_1$ included by the focus $F_1$ and the minor part 42 of the spheroid. The solid angle $\varphi_1$ can be calculated by the following formula.

$$\varphi_1 = 2\pi \left( 1 - \frac{2\sqrt{1-\frac{b^2}{a^2}}}{2-\frac{b^2}{a^2}} \right) \quad \text{Equation (1)}$$

And, the solid angle $\varphi_2$ included by the focus $F_1$ and the major part 41 of the spheroid can be calculated by the following formula:

$$\varphi_2 = 4\pi - \varphi_1 = 2\pi \left( 1 + \frac{2\sqrt{1-\frac{b^2}{a^2}}}{2-\frac{b^2}{a^2}} \right) \quad \text{Equation (2)}$$

Therefore, the ratio Q of the quantity of light irradiating the back side of the molten zone 10 to the quantity of light irradiating the front side (facing the lamp) thereof can be obtained from the ratio $\varphi_1/\varphi_2$, which represents the degree of uniformity of the irradiating light in the circumferential direction of the crystal. Q can be calculated by the following formula:

$$Q = \frac{1 - \frac{2\sqrt{1-\frac{b^2}{a^2}}}{2-\frac{b^2}{a^2}}}{1 + \frac{2\sqrt{1-\frac{b^2}{a^2}}}{2-\frac{b^2}{a^2}}} \quad \text{Equation (3)}$$

Figure 5:
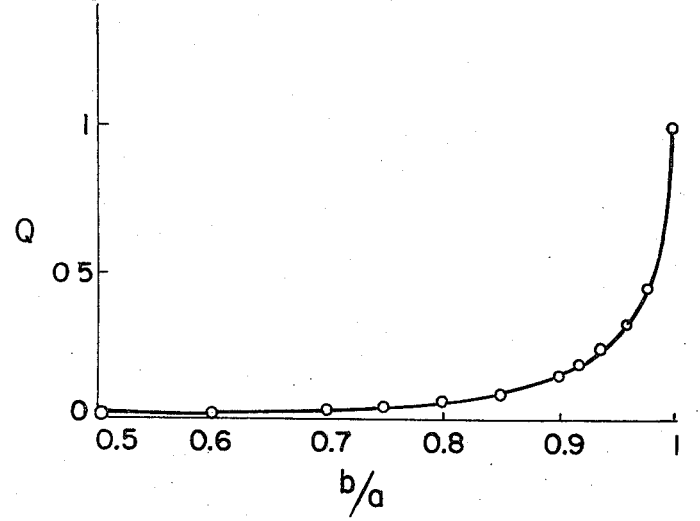
FIG. 5 is a graph showing the relationship between the dimensions of a reflective mirror and the difference in the light quantity irradiated to the front and back sides of a crystal.

By utilizing equation (3), the relation between the ratio $b/a$ of the minor diameter to the major diameter of the spheroid, and the factor Q representing the uniformity of the irradiated light may be obtained. A graph of this functional dependence is shown in FIG. 5. As shown in FIG. 5, in case where $b/a=1$, $Q=1$, the light uniformly irradiates the front and back sides. But where $b/a$ becomes smaller than 1, Q decreases rapidly and, therefore, the light quantity reaching the front and back sides of the crystal melt zone loses uniformity. Since $b/a=1$ represents an extreme case where the spheroid approaches a sphere and cannot be realized in the crystal growing apparatus, it is to be understood that when a spheroid is used as a reflecting mirror, the crystal is forced to grow under a condition of practically non-uniformity as to irradiation of light upon the front and back sides thereof.

Such non-uniformity of the energy supplied in the circumferential direction of the crystal can be overcome by rotating the crystal during growth, as indicated by the arrows 38 in FIG. 2. However, when the non-uniformity of the supplied energy in the circumferential direction is extreme, the rate of rotation must be increased to a value too high to be practicable.

Figure 6:
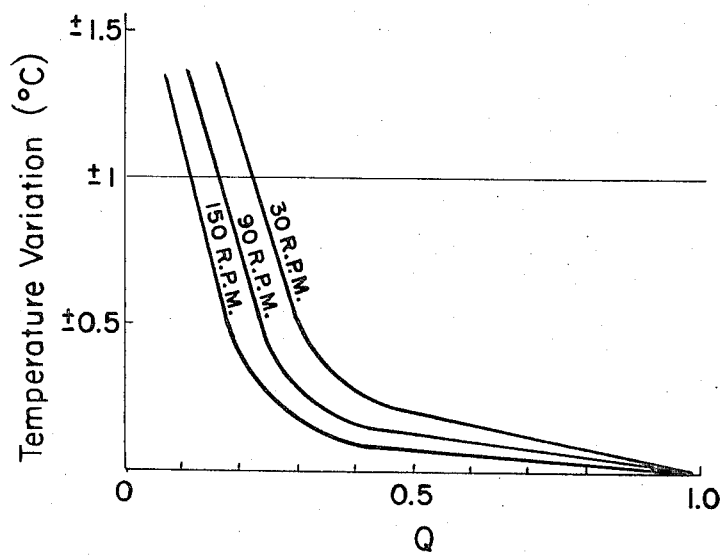
FIG. 6 is a graph showing the relationship between the difference in light quantity irradiated to the front and back sides of the crystal and the temperature difference within the crystal.

FIG. 6 shows the relation between the ratio Q of the energy quantities supplied to the back and front sides of the crystal, and the temperature variation of the rotated crystal, wherein the rate of rotation is used as a parameter. It is known by experience in crystal production that a rate of rotation exceeding 150 r.p.m. causes an unstable state for the molten zone, sometimes causing spilling of the molten material. Also, experience dictates that a temperature variation within the crystal exceeding ±1° C. gives rise to a strong tendency to generate defects within the crystal, and is therefore not practical.

In view of the restrictions based on experiences described above, it is concluded from FIG. 6 that the value of Q should be more than 0.11 for a crystal producing apparatus to be practical. FIG. 5 teaches that the value for $b/a$ should be more than 0.87 in order to satisfy the requirement that Q exceed 0.11.

Thus, it is clear that for the apparatus as shown in FIG. 2, the ratio of the minor diameter to the major diameter of the prolate spheroid reflecting mirror 23 must be more than 0.87.

Figure 7:
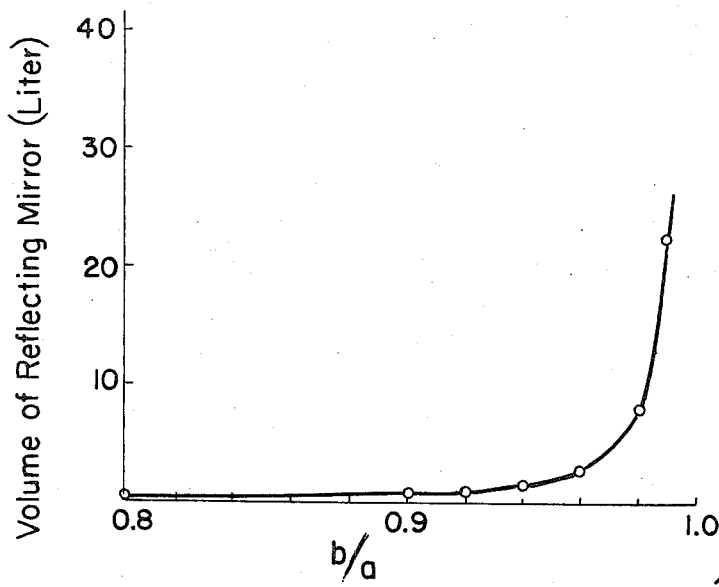
FIG. 7 is a graph showing the relationship between the ratio of minor diameter to major diameter of the reflective mirror and the volume of the reflective mirror.

In the practicable crystal growing apparatus as shown in FIG. 2, the distance between two focuses $F_1$ and $F_2$ of the reflecting mirror 23 must be larger than the radius of the quartz tube 35 plus the radius of the outer tube of the halogen lamp 21, and advantageously is at least 5 cm. or more in practice. At a given distance, the volume of the spheroid reflecting mirror was calculated as a function of the ratio $b/a$ of the minor diameter to the major diameter of the spheroid, the result thereof being indicated in FIG. 7. From FIG. 7, it is clear that where the ratio $b/a$ exceeds 0.96, the volume increases rapidly, resulting in a structure which is excessively large.

Thus, for the apparatus shown in FIG. 2 to be practical, the ratio $b/a$ of the minor diameter to the major diameter of the prolate spheroid reflecting mirror 23 must satisfy the following requirement:

$$0.87 < b/a < 0.96 \quad \text{Equation (4)}$$

Preferably, the ratio $b/a$ should be within the range of 0.90 to 0.95.

In summary then, and as described above, it has been found that by providing structure for separating the atmosphere in the vicinity of the crystal seed, crystal raw material and molten zone from the atmosphere within the reflecting mirror, and structure for blowing a gas such as air into the reflecting mirror, as well as by meeting the requirement of equation (4) for the ratio of the minor diameter to the major diameter of the reflecting mirror, the apparatus as shown in FIG. 1 is rendered practical.

An example of crystal growth by apparatus employing the prinicples of the present invention will now be described. In a reflecting mirror plated with gold having a major diameter of 170 mm. and a minor diameter of 160 mm. (volume: 2.3 liters), a halogen lamp of 1.5 kw. was lit while flowing air into the interior of the reflecting mirror at a rate of 2.5 liter/sec. A polycrystalline rod of Ni-Zn ferrite having a melting point of about 1,650° C. was first slowly heated to 1,650° C. at a rate of 500° C. per hour, and then processed into a single crystal 10 cm. long in 10 hours at a growth rate of 1 cm. per hour while rotating the rod and a speed at about 90 r.p.m. The crystal was then slowly cooled to room temperature at a rate of 300° C. per hour, thereby producing a single crystal of Ni-Zn ferrite completely free from defects. Such a crystal growing cycle can be repeated at least 5 or 6 times during the service life of a single halogen lamp and, therefore, the apparatus of the present invention has been found to be highly effective.

The above-described apparatus is merely illustrative of the principles of the present invention. Numerous modifications and adaptations thereof will be readily apparent to those skilled in the art without departing from the spirit and scope of the present invention.

What is claimed is:

1. In combination in an apparatus for producing a single crystal by a floating zone mechanism, heating means comprising a prolate spheriodal shaped reflecting mirror including first and second foci, and a major and a minor diameter, a halogen lamp disposed at one focus of said prolate spheroid reflecting mirror, the light emitted by said lamp being concentrated by said prolate spheroidal mirror at the other mirror focus to supply heat thereto, said apparatus being characterized in that said reflecting mirror has a ratio of said minor diameter thereof to said major diameter thereof in the range of 0.90 to 0.95, and that said apparatus further comprises means for replacing gas within said reflecting mirror at a rate of at least once every two seconds.

2. A combination as in claim 1, further comprising a seed crystal, additional crystalline material contiguous therewith, and mounting means for disposing the junction of said seed crystal and said additional crystalline material at said other focus.

3. A combination as in claim 2 further comprising light-passing separator means for subdividing the interior of said prolate spheroid reflecting mirror into a first part including said lamp, and a second part including said seed crystal and said additional crystalline material.

4. A combination as in claim 3 further comprising means for rotating said seed crystal and said additional crystalline material.

5. In combination in crystal growing apparatus, a prolate spheroid mirror having first and second foci and a major and a minor diameter, means coupled with said mirror for replacing gas within said mirror at a rate of at least once per two seconds, lamp means mounted at one mirror focus, contiguous seed and additional crystals having their molten junction disposed at said other mirror focus, and light-passing separator means dividing the interior of said mirror into a first part which includes said lamp, and a second part which includes said crystals.

6. A combination as in claim 5 further including means for flowing said gas through said first mirror interior part.

7. A combination as in claim 5 wherein the ratio of said mirror minor and major diameters is in the range 0.90 to 0.95.

References Cited

UNITED STATES PATENTS

| | | | |
|---|---|---|---|
| 3,053,639 | 9/1962 | Dolloff | 23—301 |
| 3,086,856 | 4/1963 | Siebertz | 23—301 |
| 3,258,314 | 6/1966 | Redmond et al. | 23—273 |

FOREIGN PATENTS

| | | | |
|---|---|---|---|
| 775,986 | 5/1957 | United Kingdom | 23—301 |

OTHER REFERENCES

Akashi et al.: Prep. of Ferrite Crystals, etc., IEEE Transactions on Magnetics, vol. MAG–5, pp. 285–289 (September 1969).

NORMAN YUDKOFF, Primary Examiner

R. T. FOSTER, Assistant Examiner

U.S. Cl. X.R.

23—301 SP, 305